(12) United States Patent
Sansone et al.

(10) Patent No.: US 6,370,238 B1
(45) Date of Patent: *Apr. 9, 2002

(54) SYSTEM AND METHOD FOR IMPROVED USER INTERFACE IN PROMPTING SYSTEMS

(75) Inventors: Elaine J. Sansone, Sunnyvale; William J. Beyda, Cupertino; Ronald Robert J. Carleton; Edward Anthony Del Prete, both of San Jose; Steven Duane Hopla, Mountain View; David Harmon Howell; Jose Garcia Reyes, both of San Jose; Bernie Vallez, Santa Clara; Steven Bryan Wilson, San Jose, all of CA (US)

(73) Assignee: Siemens Information and Communication Networks Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,390

(22) Filed: Sep. 19, 1997

(51) Int. Cl.[7] .................................. H04M 1/64

(52) U.S. Cl. ................. 379/88.23; 379/71; 379/88.25; 379/88.16

(58) Field of Search .......................... 379/88.01, 88.04, 379/88.22, 88.23, 88.24, 88.25, 88.16, 917, 70–72, 74, 76, 214.01, 260.01, 266.02, 93.12

(56) References Cited

U.S. PATENT DOCUMENTS

| | | | | |
|---|---|---|---|---|
| 4,521,647 A | * | 6/1985 | Olson et al. ................ 379/351 |
| 4,837,798 A | | 6/1989 | Cohen et al. .............. 379/88.14 |
| 4,932,021 A | * | 6/1990 | Moody ..................... 379/88.25 |
| 5,166,971 A | | 11/1992 | Vollert ..................... 379/88.02 |
| 5,276,731 A | | 1/1994 | Arbel et al. ................ 379/88.2 |
| 5,307,460 A | | 4/1994 | Garten ...................... 704/219 |
| 5,420,912 A | | 5/1995 | Kopp et al. ................ 455/563 |
| 5,426,460 A | | 6/1995 | Erving et al. .............. 348/14 |
| 5,479,488 A | * | 12/1995 | Lenning et al. .......... 379/88.04 |
| 5,488,650 A | * | 1/1996 | Greco et al. ............ 379/88.22 |
| 5,495,528 A | | 2/1996 | Dunn et al. ................ 379/367 |
| 5,499,288 A | | 3/1996 | Hunt et al. ............... 379/88.02 |
| 5,519,807 A | | 5/1996 | Cellario et al. ............ 704/224 |
| 5,553,121 A | * | 9/1996 | Martin et al. ............ 379/88.01 |

(List continued on next page.)

OTHER PUBLICATIONS

Harry Newton, Newton's Telecom Dictionary, 8th Edition, ISBN 0–936648–60–0, pp. 545 & 1051, Nov. 1994.*

D.A. Gaganelis, Dip. Ing., MSc, MIEEE and E. D. Frangoulis, Dip. Ing., Ph.D., MIEEE "A Novel Approach to Speaker Verification," taken from International Conference on Acoustics, Speech & Signal Processing, IEEE, 1991, vol. 1, pp. 373–376.

Herbert Gish, "Robust Discrimination in Automatic Speaker Identification," taken from International Conference on Acoustics, Speech & Signal Processing, IEEE, 1990, vol. 1, pp. 289–292.

(List continued on next page.)

*Primary Examiner*—Fan Tsang
*Assistant Examiner*—Roland G. Foster

(57) ABSTRACT

An improved prompting system for accessing specified functions. According to one embodiment, a particular user may identify himself to the system and thereafter preprogram one or more paths that lead directly to a desired function within the hierarchical menu prompting system. The next time the user needs to access the system the user can navigate directly to the desired function by pressing a predetermined key or sequence of keys on his or her Touch-Tone dial. Alternatively, the prompting system may present as an option a direct path to the desired function.

18 Claims, 9 Drawing Sheets

U.S. PATENT DOCUMENTS

| | | | | |
|---|---|---|---|---|
| 5,557,659 A | | 9/1996 | Hyde-Thomson | 379/88.13 |
| 5,561,703 A | | 10/1996 | Arledge et al. | 455/31.2 |
| 5,568,540 A | | 10/1996 | Greco et al. | 379/88.25 |
| 5,574,888 A | | 11/1996 | Pandtiji et al. | 395/500.47 |
| 5,581,608 A | | 12/1996 | Jreij et al. | 379/93.17 |
| 5,594,784 A | | 1/1997 | Velius | 379/88.02 |
| 5,604,790 A | * | 2/1997 | Grimes | 379/88.04 |
| 5,608,783 A | | 3/1997 | Ichnowski et al. | 379/88.18 |
| 5,719,921 A | * | 2/1998 | Vysotsky et al. | 379/88.01 |
| 5,818,908 A | * | 10/1998 | Kaplan | 379/88.21 |
| 5,825,856 A | * | 10/1998 | Porter et al. | 379/93.12 |
| 6,016,336 A | * | 1/2000 | Hanson | 379/88.23 |

OTHER PUBLICATIONS

Jayant M. Naik, et al., "Speaker Verification Over Long Distance Telephone Lines," taken from Speech Processing 1, S1, International Conference on Acoustics, Speech & Signal Processing, vol. 1, IEEE, 1989, pp. 524–527.

L. De Vos, et al., "Algorithm and DSP–Implementation for a Speaker–Independent Single–Word Speech Recognizer with Additional Speaker–Dependent Say–In Facility," taken from Proceedings Third IEEE Workshop on Interactive Voice Technology for Telecommunications Applications, Sep. 30–Oct. 1, 1996, pp. 53–56.

* cited by examiner

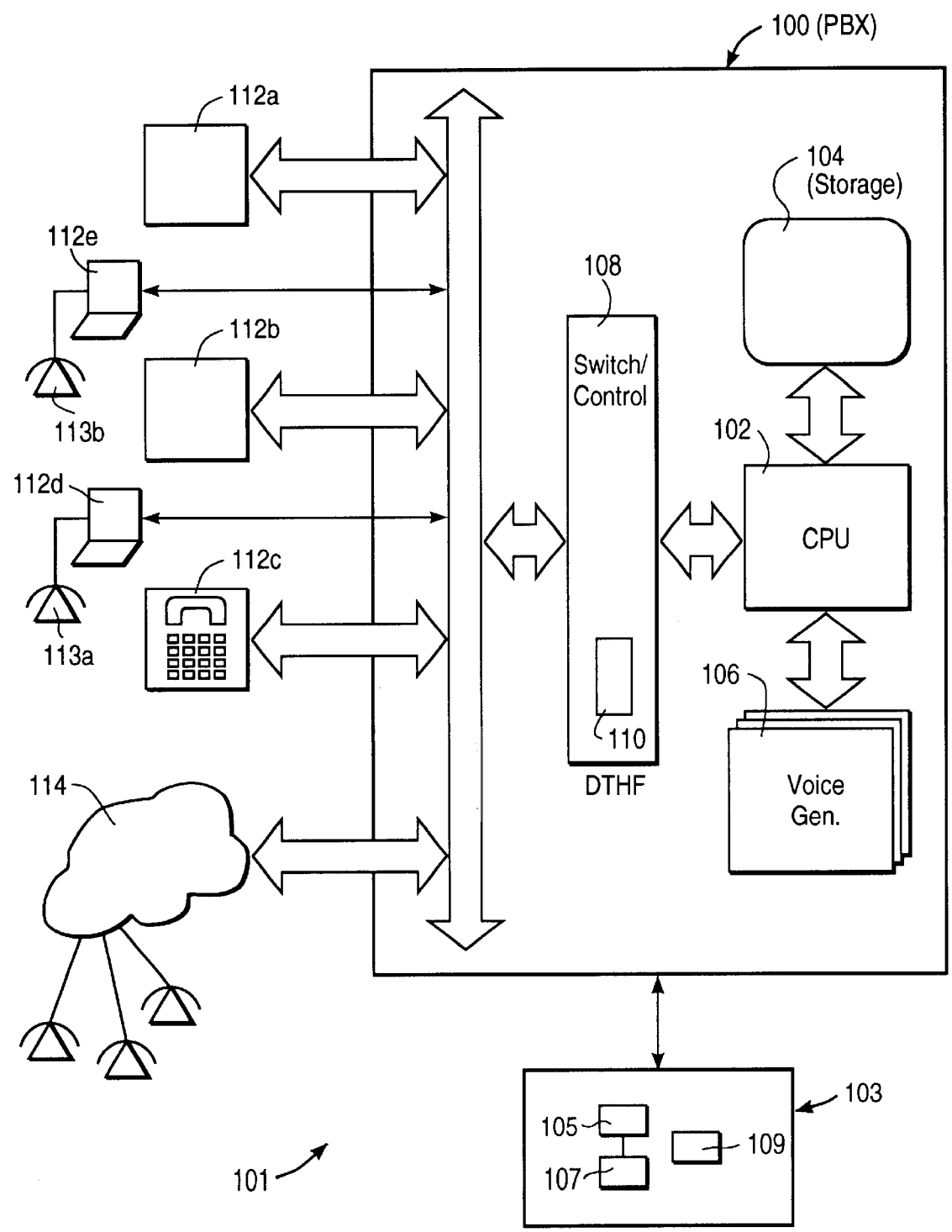
FIG_1

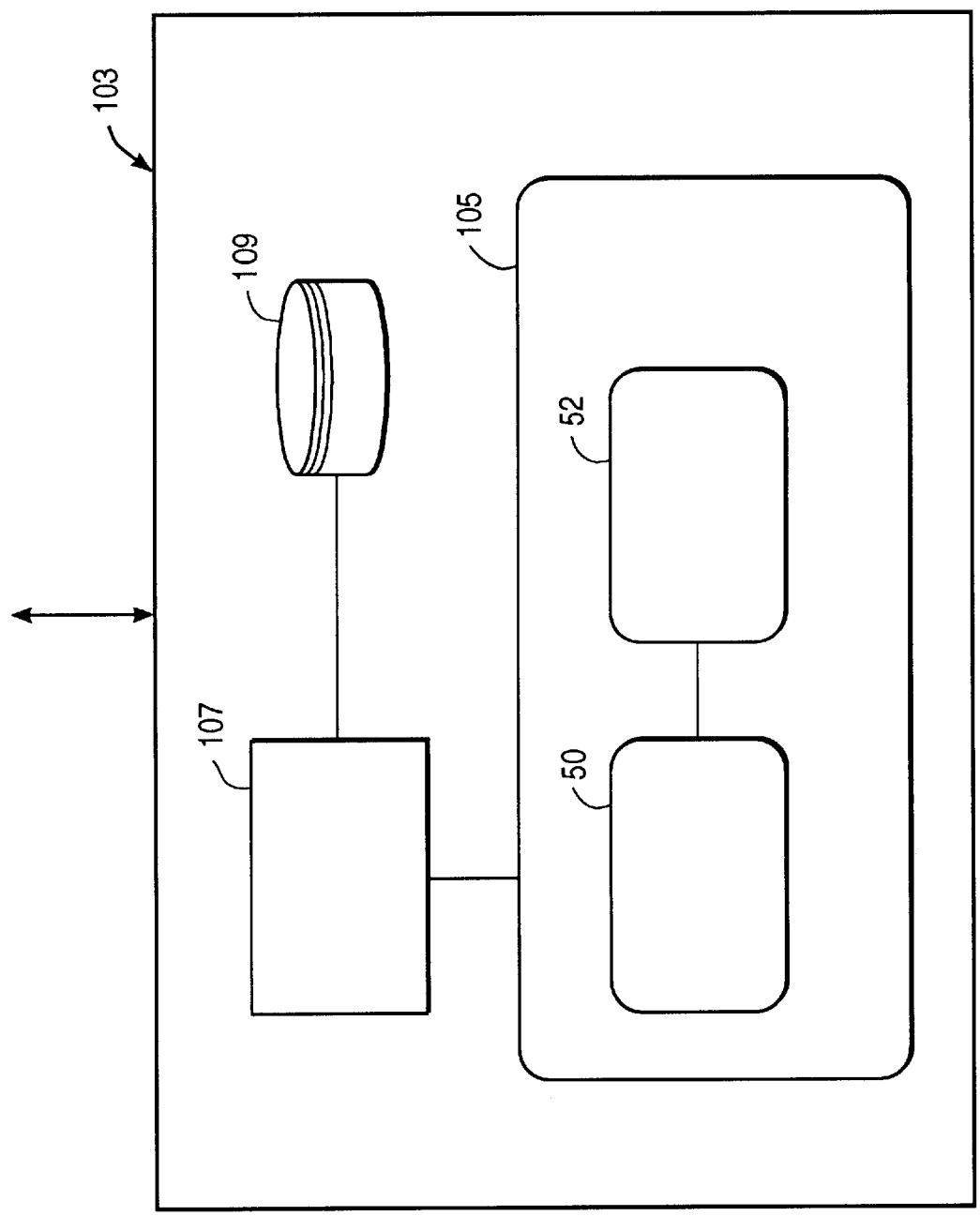

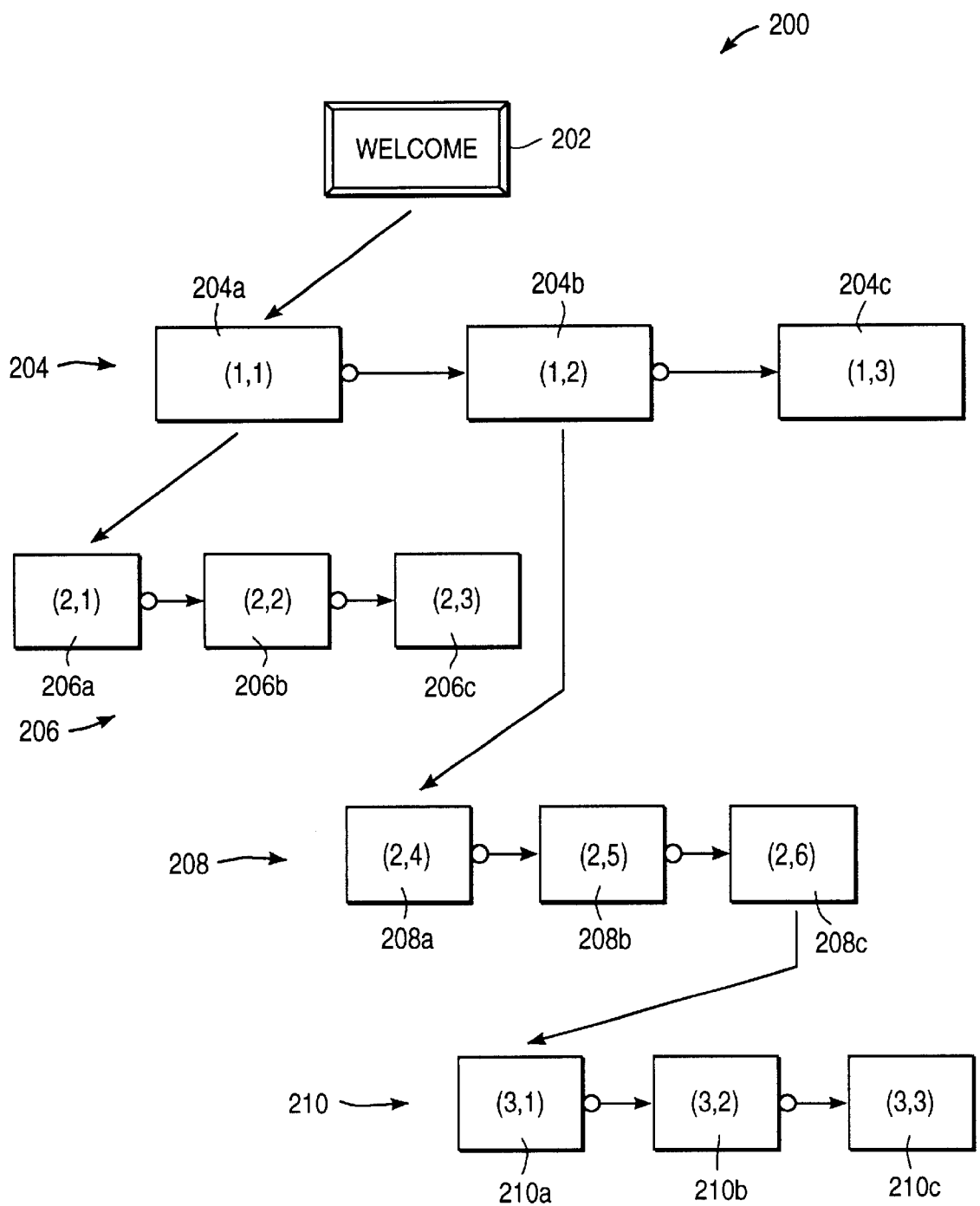
FIG_3

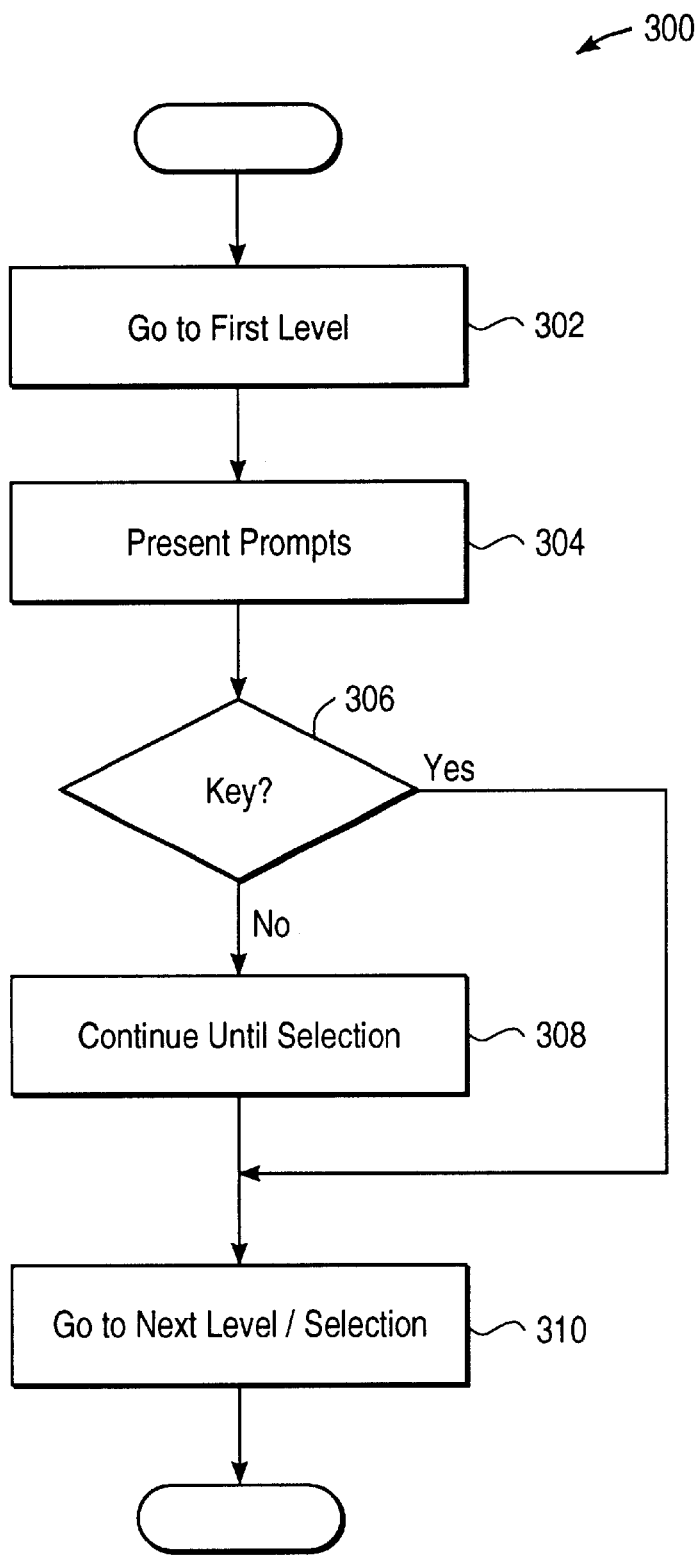
FIG_4

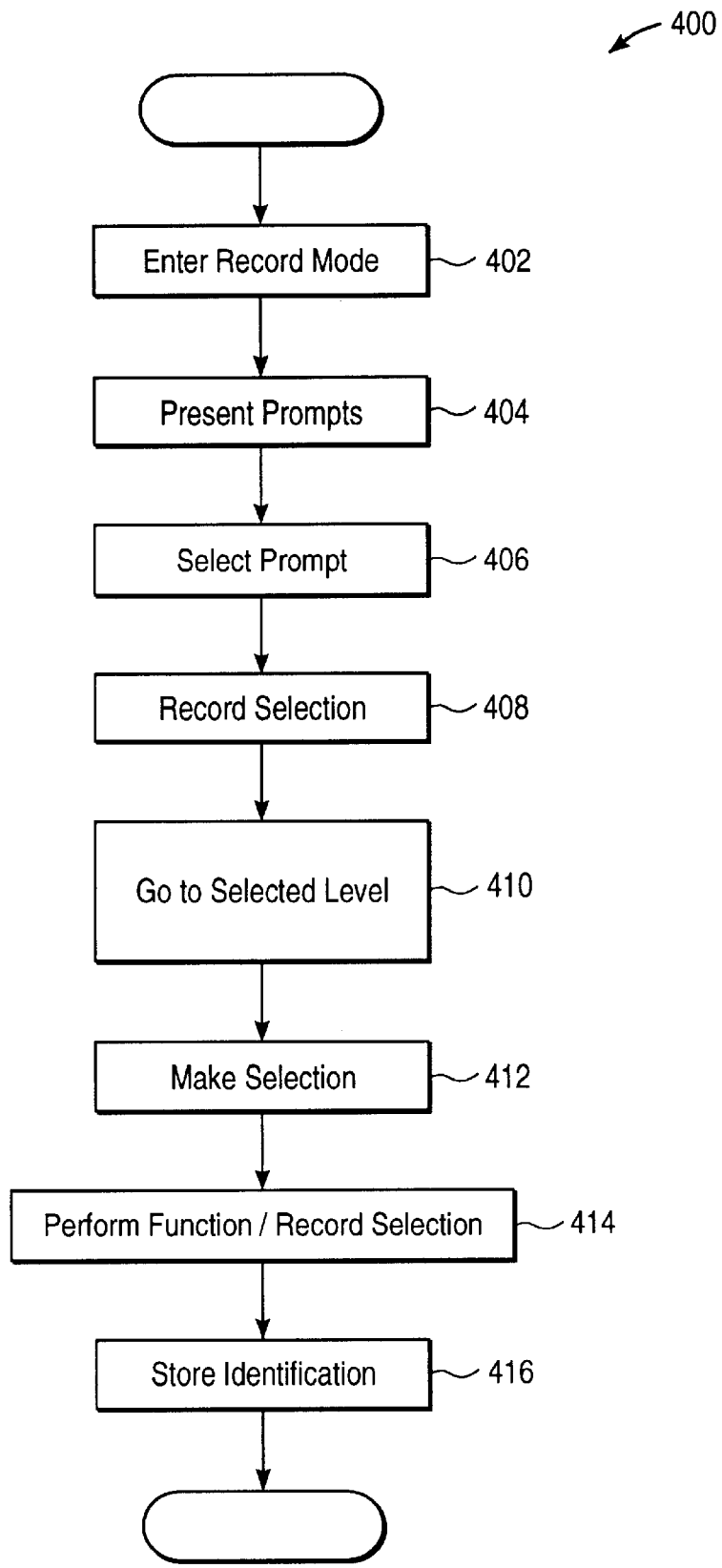
FIG_5

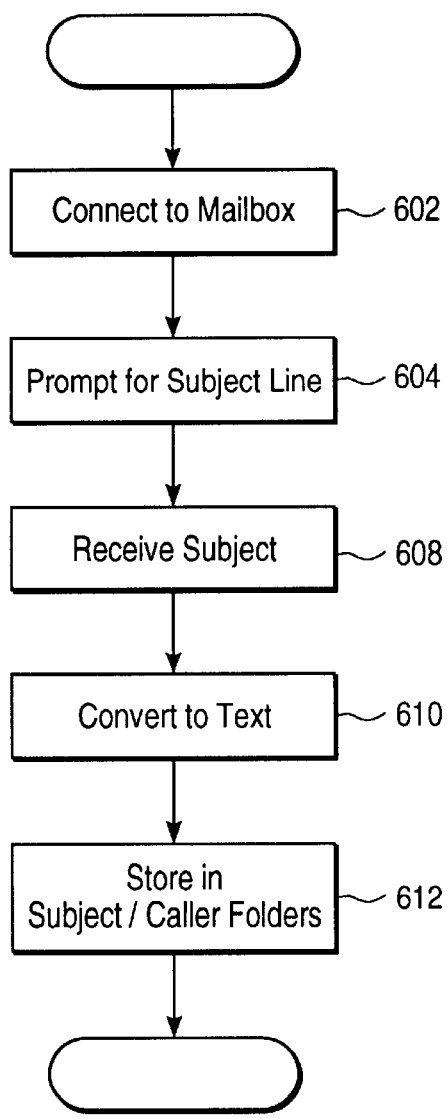
FIG_6A
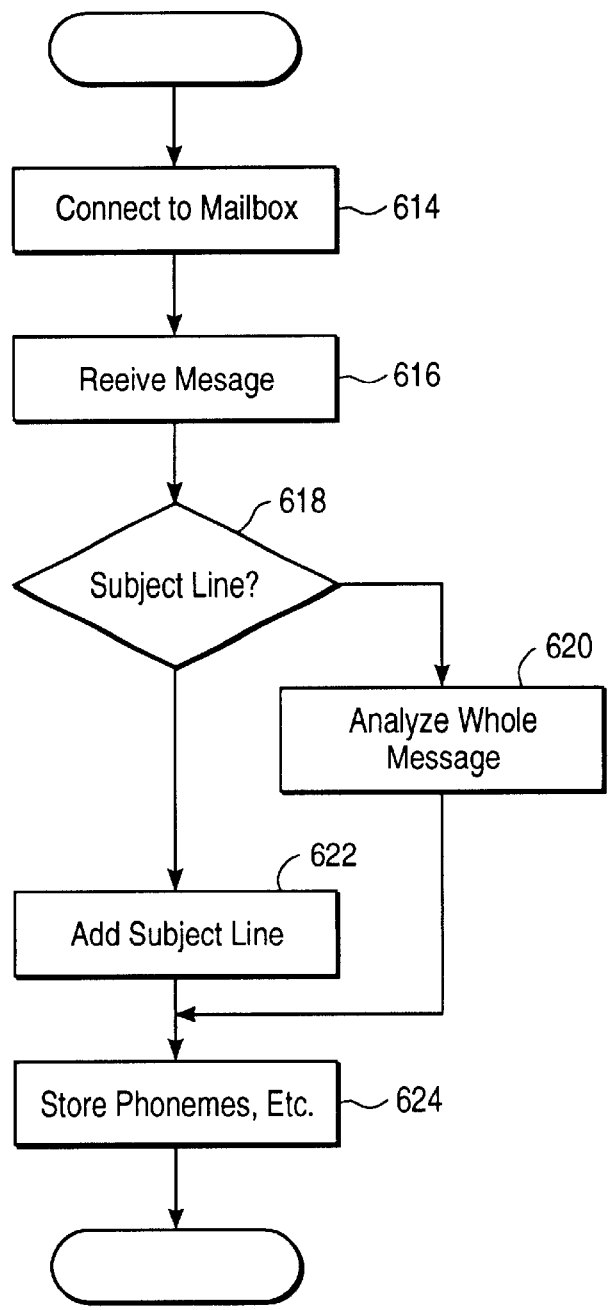
FIG_6B

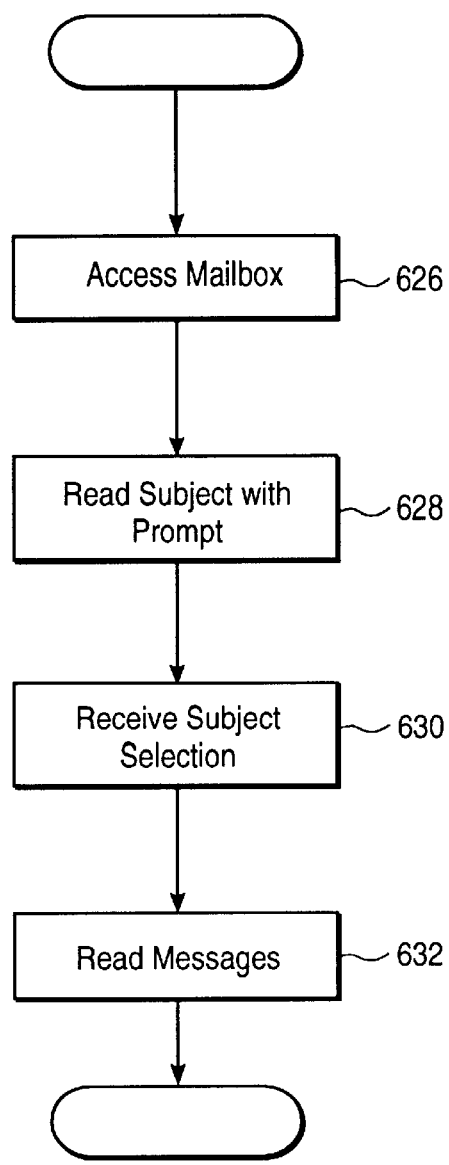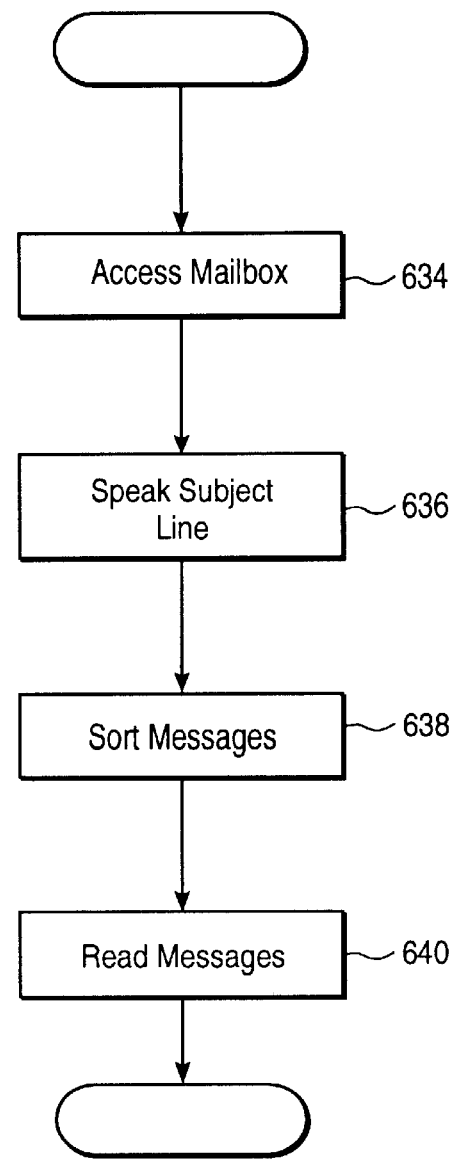

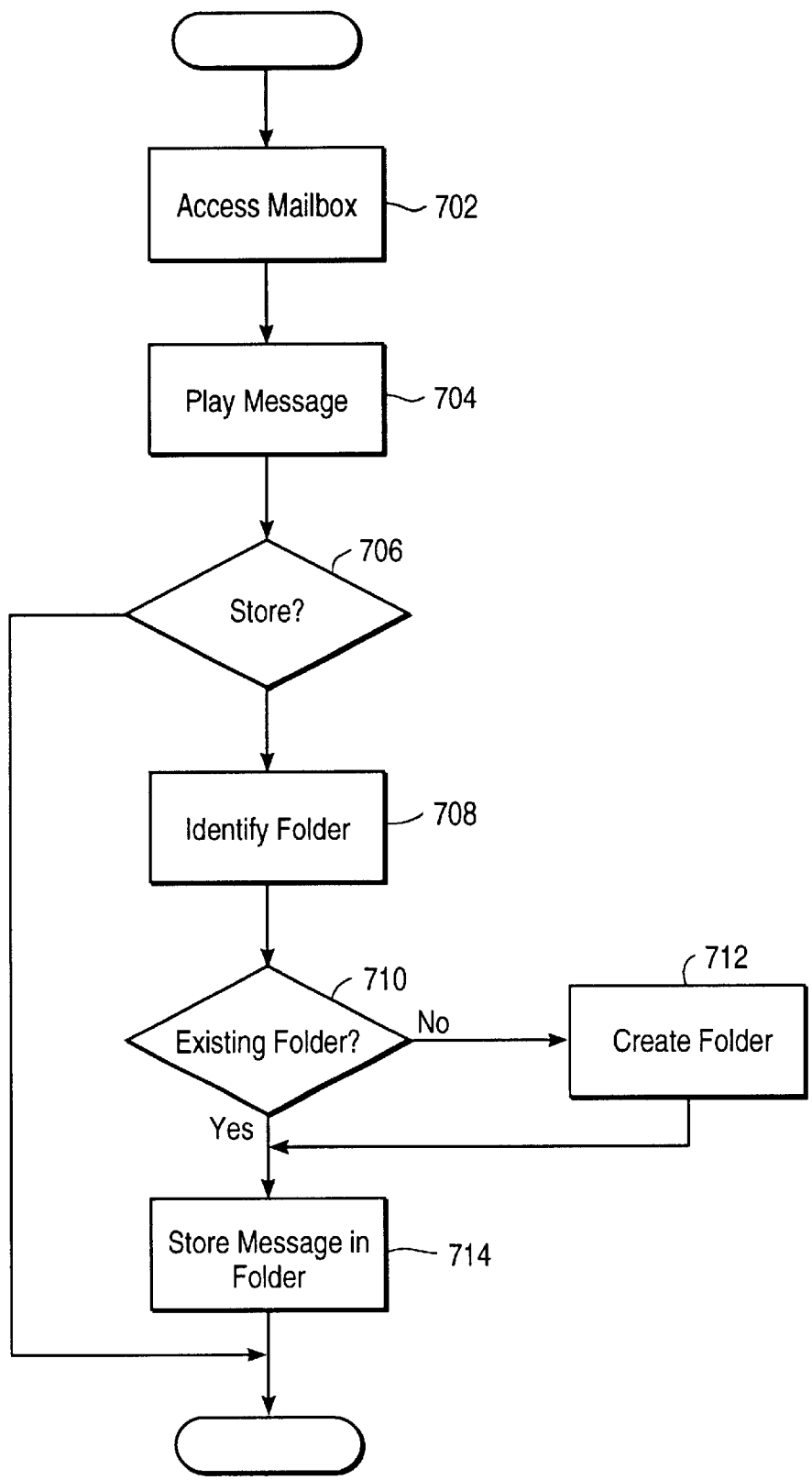
FIG_7

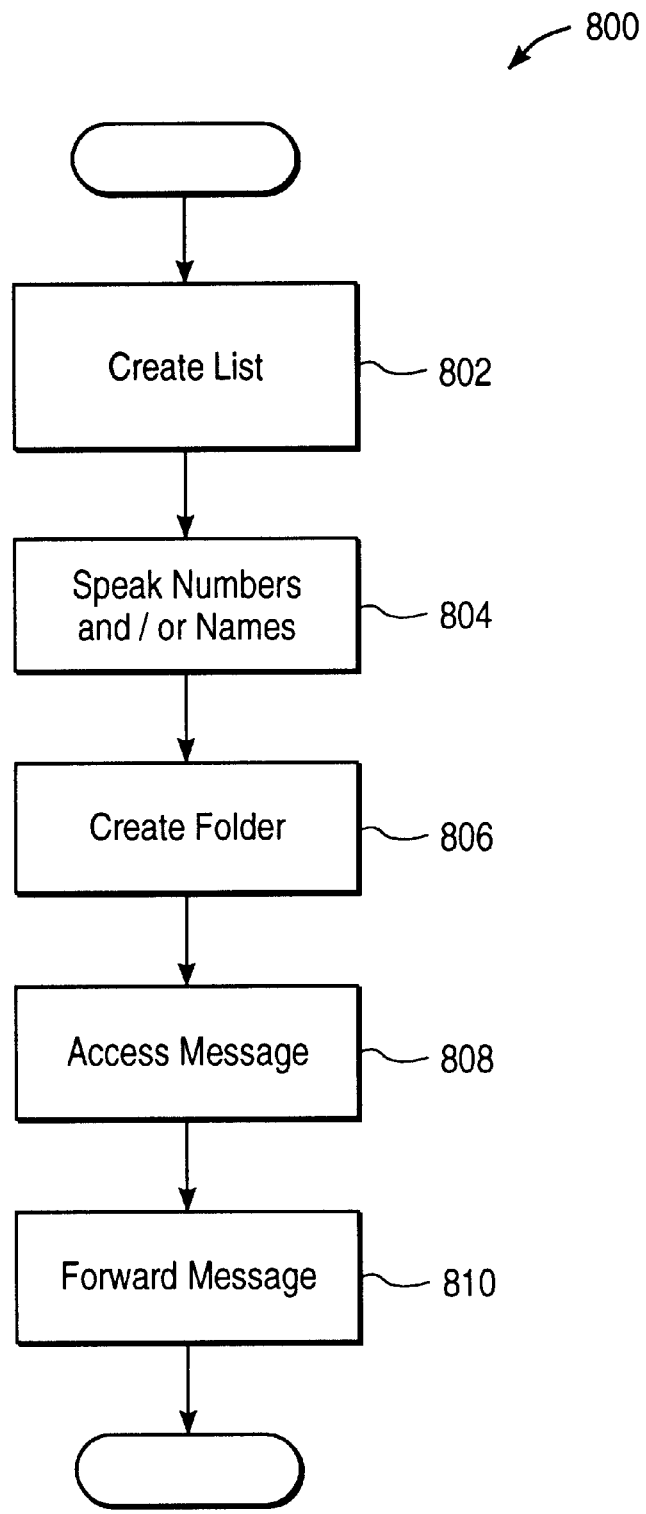
FIG_8

SYSTEM AND METHOD FOR IMPROVED USER INTERFACE IN PROMPTING SYSTEMS

CROSS REFERENCE TO RELATED APPLICATIONS

This application is related to "System and Method for Organizing Multi-media Message Folders from a Displayless Interface and Selectively Retrieving Information Using Voice Labels," Ser. No. 08/934,148 and "System and Method for Adding a Subject Line to a Voice Mail Message," Ser. No. 08/953,786, now U.S. Pat. No. 6,069,940, both filed concurrently herewith.

BACKGROUND OF THE INVENTION

1. Field of the Invention

The present invention relates to prompting systems and, more particularly, to an improved method for navigating through a prompting system.

2. Description of the Related Art

Telephone-based prompting systems are in increasing use both to provide an interface to voicemail systems and to provide an interface for interactive voice response systems, such as airline reservations, bank customer account lines, and other institutional lines such as for government, utilities, credit card companies and the like. In such systems, users are presented with hierarchical levels of prompts which are navigated by pressing buttons on the telephone keypads. The resulting DTMF (dual tone multifrequency) signals are received by the prompting system and used to access a different level in the hierarchy or to access a specified function.

Frequently, such prompting systems cause user frustration in that they provide only a predetermined set of prompts in a predetermined order.

The user who knows his way through the set of prompts to reach a known destination must nevertheless be presented with a voice message identifying each prompt state. While sequential overrides are available, the user must still key in an entry for each state.

Certain known telephone prompting systems permit a user to select a function which abbreviates the prompts. Thus, for example, rather than messages such as "For information concerning flight arrivals and departures, please press 1 now", the user might be presented with the message "Arrivals and departures, press 1." Such systems still, however, require the user to navigate through each of the prompts prior to reaching a desired function. Similarly, other systems allow the user to skip from one hierarchical level to another hierarchical level, but only upon being provided with a separate prompt.

Non-institutional dynamic prompting systems (i.e., those not already "fixed"), such as those for in-house voice mail systems, similarly suffer from inefficiencies in storage and retrieval. More particularly, users of such systems who wish to save messages have no way of organizing the stored messages when they use a displayless interface, such as a telephone. Such users have only the option of saving or not saving the messages. The messages then are saved in a linear queue. Frequently, such messages are saved in forward or reverse chronological order, without any further added information. If any of the saved messages is to be retrieved, the user must listen to each prompt for each message or for its header. The user is thus unable to screen his stored message for a desired one in particular.

While the use of a graphical user interface (GUI), such as those available in computer-telephony interface (CTI) systems, provides an ability to organize messages, such GUIs often are not available if users wish to access messages remotely.

What is needed, therefore, is an improved method for navigating among hierarchical levels and across hierarchical levels in a telephone prompting system. There is particularly a need for a prompting system in which a user can more rapidly navigate to a desired function. There is a further need for an improved method of organizing voicemail or multi-media messages from a displayless interface. There is particularly a need for a prompting or messaging system which permits on-the-fly voice labeling and message organization.

SUMMARY OF THE INVENTION

These and other drawbacks of the prior art are overcome in large part by a system and method according to the present invention. According to one embodiment of the present invention, a prompting system is provided wherein a particular user may identify himself to the system and thereafter preprogram one or more paths that lead directly to a desired function within the hierarchical menu prompting system. The next time the user needs to access the system, the user can navigate directly to the desired function by pressing a predetermined key or sequence of keys on his or her Touch-Tone dial, or by speaking a predetermined word or sequence of words. Alternatively, the prompting system may present as an option a direct path to the desired function. A yet further embodiment of the present invention permits the user to navigate from one of a specified hierarchical levels to another of a specified hierarchical levels, for example, by specifying the hierarchical level to which the user wants to reach or by specifying a number of levels back through which the user wishes to return.

A multimedia messaging system according to another embodiment of the invention permits a caller to add a subject line to a message. The voicemail system can then recognize the subject and play only messages identified by the subject line. A further aspect of this embodiment is an automatic subject line or topic search system. For example, the voicemail system may be preprogrammed to record the first 10 or 15 seconds of a recorded message and automatically use these words as the subject line. The recorded subject line for unplayed messages may then be searched as desired. Alternatively, the entire message may be converted to searchable text. If the user speaks a word, the system searches received messages for those containing the text.

A voicemail system according to another aspect of the present invention allows a user to remotely organize stored messages in hierarchical folders from a displayless interface. According to this aspect of the invention, once the user has retrieved and played his messages, the voicemail system permits the user to add a folder name or subject line, for example changing the subject line left by the caller, and thereafter store the message according to a user-defined hierarchy. A still further aspect of the invention allows the user to create a macro to send or forward messages or create distribution lists or group lists on the fly.

BRIEF DESCRIPTION OF THE DRAWINGS

A better understanding of the present invention is obtained when the following detailed description is considered in conjunction with the following drawings in which:

FIG. 1 is a block diagram of a telephone prompting system according to an embodiment of the present invention;

FIG. 2 is a more detailed block diagram of a voicemail server according to an embodiment of the present invention;

FIG. 3 is a representation of a hierarchical menu system according to an embodiment of the present invention;

FIG. 4 is a flow chart of a method according to an embodiment of the present invention;

FIG. 5 is a flow chart of a method according to another embodiment of the present invention;

FIG. 6 is a flow chart of a method according to another embodiment of the present invention;

FIG. 7 is a flow chart of a method according to another embodiment of the present invention; and FIG. 8 is a flow chart of a method according to another embodiment of the present invention.

DETAILED DESCRIPTION OF THE INVENTION

Turning now to the drawings and with particular attention to FIG. 1, a block diagram illustrating an interactive voice response (IVR) system 101 according to an embodiment of the present invention is shown. It is noted that, while illustrated as an IVR system, any type of messaging system, such as an integrated voice and e-mail system may be employed. The IVR 101 may be a customer relations prompting system or a voicemail system, or any combination thereof. The system according to the invention is configured to permit enhanced organization and navigation over prior IVR's. The interactive voice response system 101 includes a private branch exchange (PBX) 100. It is noted that while a PBX 100 is shown, a variety of other switching and/or control facilities may be employed according to the present invention. Thus, FIG. 1 is exemplary only. The PBX 100 includes a central processing unit (CPU) 102 for controlling the functions of the PBX 100. The CPU 102 is representative of, for example, a Pentium, Pentium Pro or Pentium II-type or compatible processor. The CPU 102 is coupled to a storage device 104. The storage device 104 is used to store routing information relating to the hierarchical prompt system. The CPU 102 is further coupled to a voice generation unit 106 for generating predetermined voice messages. Such voice generating systems are well known in the art. The voice generation unit 106 may be either a true voice generator or a storage device with preprogrammed or prerecorded messages. The CPU 102 is coupled to a switch control unit 108 which controls switching among a plurality of devices which are operably coupled to the PBX 100. The switch control unit 108 further includes a dual tone multi-frequency (DTMF) unit 110 configured to receive and transmit DTMF and digital signals. A plurality of telephony devices 112a–112c such as telephones, facsimile machines, and the like, are coupled to the PBX 100. In addition, the telephony devices may include a variety of personal computers 112d, 112e, with telephones 113a, 113b coupled to them. The computers and telephones may be configured to interact with one another using the TAPI or TSAPI protocols. The PBX 100 is further coupled to the public switched telephone network (PSTN) 114.

In addition, a voice messaging server 103 may be coupled to the PBX 100 and configured to provide voicemail services to a plurality of users. A voice recognition module 105, a control unit 107, and a memory 109 are provided for identifying spoken terms to be used for creating and maintaining a folder hierarchy. The voice recognition unit 105 and control 107 are configured to recognize predetermined speech and convert it to text, or otherwise use the speech to provide a "subject line" or folder title for the message and use the categories of subject to establish a folder-like hierarchy. According to one aspect of the invention, the "subject lines" and/or folder names are text-converted and usable by a graphical user interface (not shown), such as the personal computers 112d, 112e as well as being navigable by either voice or key entry.

A more detailed block diagram of a voice messaging server 103 according to an embodiment of the present invention is shown in FIG. 2. As discussed above, a voice messaging server 103 according to an embodiment of the present invention includes a control unit 107 coupled to a memory unit 109 and a voice recognition unit 105. The control unit 107 may be, for example, a microprocessor such as a Pentium or Pentium Pro. It is noted that, while illustrated as a separate unit from the PBX, the voice messaging server may be integrated therein, and the CPU may perform the voice recognition control functions, as well. Thus, the figures are exemplary only.

The voice recognition unit 105 is coupled to receive encoded voice data; for example, linear predictive coding filter coefficients and/or excitation encoding indices such as provided by a VSELP (vector sum excited linear prediction) coder. In a VSELP coder, the filter coefficients are representative of, for example, the resonant peaks or formants of the input speech. Other types of coding may be employed.

The voice recognition unit 105 includes a frequency response and peak detector circuit 50 configured to detect the peak values of vocal frequencies. A formant extraction unit 52 is coupled to the output of the peak detector 50 to extract the formants of the characterized speech. The formants are applied by the control unit 50 to search a phoneme database in storage unit 109, which includes information in database form which correlates formants to phonemes. The control unit 107 interacts with the database to select the best representative phoneme and applies this data to the phoneme-to-text converter. The phoneme-to-text converter generates a textual representation of the associated phoneme speech patterns. The text converted speech patterns may be representative of, for example, topics, subject lines, folder titles, input coordinates, or the like.

While a particular voice recognition module has been described above, the voice recognition unit 105 may be any of a variety of known voice recognition modules, such as phoneme based voice recognition systems, with a capability to introduce new words and make them available on the fly. In such systems, phoneme pre-processing of a sufficiently large vocabulary of lexicon may be employed, either via voice or text input. For example, the voice recognition unit 105 may be a voice recognition card such as a DVM-4S voice recognition board available from Voice Control Systems, Inc., Dallas, Tex., or may use systems such as those described in Hunt et al., U.S. Pat. No. 5,499,288, assigned to Voice Control Systems, Inc., or the system described in Vollert, U. S. Pat. No. 5,166,971, assigned to Siemens AG, or the system described in Arbel et al., U.S. Pat. No. 5,276,731 and assigned to Siemens Business Communications Systems, Inc., and which are hereby incorporated by reference in their entirety as if fully set forth herein. Another system which may be employed is De Vos and Kämmerer, "Algorithm and DSP Implementation for a Speaker-independent Single-Word Speech Recognizer With Additional Speaker-Dependent Say-In Facility," Proceedings, Third International Workshop on Interactive Voice Technology for Telecommunications Applications, Sep. 30–Oct. 1, 1996, Basking Ridge, N.J., also incorporated by reference in its entirety as if fully set forth herein. Similarly, text-to-phoneme conversion may be accomplished using the Pure-Speech ReCite! system, available from Pure Speech, Inc.

According to an embodiment of the present invention, the voice recognition unit 105 is responsive to both callers and users. A caller may use or interact with the voice recognition unit 105 to provide a subject line when he leaves a message for the user. For example, if the caller calls and is directed to the user's voicemail box, the caller will be prompted to leave a message. Either before he begins recording the message or after he has concluded recording the message, the voicemail system will prompt the user to speak a subject into his telephone. The voice recognition unit 105 recognizes the speech and converts the subject line to a text equivalent, as will be discussed in greater detail below, which is stored along with the voice message.

Other techniques may be used to input a subject line. For example, the caller may enter a one or two word subject on a Touch-Tone keypad or may type the subject into a PC network computer or terminal that is connected to the voicemail system through the telephone. Text-to-phoneme conversion may then occur for phoneme-based analysis (and recognition of future voice input), as discussed in greater detail below. The text-to-phoneme conversion may be accomplished using the PureSpeech ReCite! system, available from Pure Speech, Inc. Finally, the caller can simply add the subject by speaking into the handset and the voice recorded as an audio subject with no text conversion at all. Alternatively, the system may monitor all or a predetermined portion of the message (e.g., 10 seconds) for search terms identifiable as topics.

Once the caller-supplied subject line has been added and converted to text, the system may perform searches on the subject lines of unplayed messages so that the user can access his messages by subject. If no text conversion is provided, searches may still be accomplished, though they must be based on phoneme analysis and comparison, which is more time-consuming than a text search. According to another aspect of the invention, if no subject line provision is made, the voice recognition unit 105 may nevertheless still be provided to analyze the received voice signals. The message may be converted in its entirety to text or simply stored as phonemes.

When the user wishes to access his unplayed messages, he may do so by subject; for example, by speaking a topic such as "budget." The system will then search through all the received unplayed messages in order to find the use of the phrase "budget." The system will then present the user with each unplayed message relating to the topic "budget." The voicemail system will then provide the user with the option of storing the message. At this point, the user may accept the subject line as the name of a folder, or may speak or key in another name. If spoken, the term (either text or phoneme) is compared to the stored subjects and the appropriate message accessed. The name may be either the name of an existing folder or the name of a new folder. As will be discussed in greater detail below, in order to access stored messages, the user may either speak the name of a folder in order to be directed to all of the folders under that topic, or may speak or key in a coordinate of the folder or particular message, or may key in an alpha-numeric label for the particular label. In addition, according to the present invention, creating the folder hierarchy using a displayless interface may also cause an update of a text-based graphical user interface folder system. For example, the search term or topic may be used as a folder name, and the message stored thereunder with some identifier. The next time the user uses his computer, he may access his message by text or a folder graphic.

Turning now to FIG. 3, a diagram generally illustrating a hierarchical prompting system 200 according to the present invention is shown.

According to an embodiment of the present invention, a caller calls the user's voicemail system and leaves a message. The voicemail server 103 may provide the caller with the option of leaving a message header, or subject line. The voice recognition unit 105 identifies the subject, which is used by the controller 107 to classify and store the message in an appropriate folder. Alternatively, the system may be configured such that a predetermined word or phrase within the body of the message are searched-for, and the message again is stored accordingly.

When accessing the system, a remote user of a telephony device 112a–112c calls in to the system and the CPU 102 accesses both the storage device 104 and the voice generator unit 106 to provide voice responses to various user inputs. The system may be responsive to voice recognition or a keyed entry coordinate navigation system may be provided. Initially, a welcome message 202 may be presented. The user may have the ability to speak a subject line or folder name, which will be recognized by the system. In a more limited system, the voice recognition unit may recognize only a few words or numbers. In that case, the user may speak "next", or a coordinate, as will be discussed in greater detail below. The user will be directed to the corresponding level. Alternatively, the welcome message 202 may provide entry to a first hierarchical level 204 of menus or prompts. A plurality of prompts 204a–204c are then presented one after the other. At each prompt, the user may be given the option of pressing a particular button or speaking a particular phrase to proceed to a next function or level. Thus, for example, at a prompt 204a, the user is directed to a second level of prompts 206. At a prompt 204b, the user is directed to a second level of prompts 208.

In the example illustrated, a prompt 204c is a terminus. When presented with the prompt 204c, the user presses a button and a function (such as delivering a message, or delivery of account balance information in an IVR) is returned. Each prompt at the second level of prompts 206, 208 may itself be a function or give the option of proceeding to a next level of prompts. A third level of prompts, descending from the prompt 208c of prompt level 208, is shown as prompt level 210.

As discussed above, users may be presented with a prompt message at each hierarchical prompt level. For example, at the first hierarchical prompt level 204, the user may be presented with a message at prompt 204a. If the user undertakes no action at that point, the user will be presented with a message at prompt 204b and if no further action is taken, the user presented with a user prompt message at prompt 204c. If the user does not wish to wait through the entire messages at the prompts 204a and at 204b, but instead wishes to proceed to a selection at 204c, the user need not do so. Instead, the user may select a key, for example, the pound (#) key or the star (*) key while the prompt at 204a is being delivered. Alternatively, the user may speak "next". Selecting the pound key or the star key or speaking "next" will cause the prompt message to jump from the 204a prompt to the prompt 204b. If the prompt message 204b begins and the user wishes to skip the prompt 204b, the user can speak or press the pound key or the star key again and will be delivered to the prompt message at prompt 204c.

According to an aspect of the invention, the user may store a particular path taken so that at a future time, the user need not navigate through the entire prompt system prior to arriving at the desired function. Thus, for example, a user may have accessed the system and been identified, for example, via a password (or account number) and navigate to a function at the third hierarchical level 210, specifically function 210a.

Either before or after the function is executed, the user may be given the option to store the function path taken, i.e., the end function selected. If the user accepts the option, for example, by selecting the pound key or the star key, the user may be given the option the next time he logs in to proceed directly to that function.

For example, according to an embodiment of the invention, the CPU 102 stores in storage unit 104 an association of the function with the user. The next time the user logs in, a new prompt may be provided to the user and a new user message provided from voice generator 106 giving the user the option of selecting a function key to directly execute the function identified by the prompt at 210*a*. If the user does not wish to use the function, the user may proceed to the default prompt navigation system.

Alternatively, the system may provide the user, upon log in, of the option of inputting the coordinates of the function last selected. Thus, for example, if the last function selected was that associated with prompt 210*a*, the user would be given the option of inputting the digits (3,1) (either by keying in or speaking) which represent the third hierarchical level, first function. The user would then proceed directly to that function. Again, if the user does not want that function, he may skip it or proceed in the normal course to the default navigational hierarchy.

A still further embodiment of this coordinate function does not provide a prompt at the initial log in, but merely will accept the input of coordinates that will immediately jump the user to the desired function. Thus, for example, if the user is being presented with the prompt message at prompt 204*a*, the user may press pound (#) and then certain digits on the keypad (3,1) to indicate that he wishes to jump immediately to the function at prompt 210*a*. Alternatively, the user may speak the words (3,1) and be directed to prompt 210*a*.

Another embodiment of the present invention includes the CPU 102 storing in storage unit 104 a function navigation coordinate menu which permits the user to access a specified function. For example, the user may at any time interrupt presentation of specified prompt messages and be directed to a menu. For example, the user may press the pound key or the star key and be directed to the menu system. This may include, for example, a recitation of an abbreviated prompt list followed by keys to be pressed in order to go directly to the specified function. In one embodiment, the user may input numbers corresponding to letters on the alphanumeric keypad. Thus, for example, if the user wishes balance information, the user may press buttons (2,2,5)(BAL) in order to get the balance information function. Alternatively, at each prompt, the user may be presented with a coordinate address of that particular prompt. If the user wishes to return to the prompt corresponding to a desired function sometime later in his session at the prompting system, he need only type in the numeric address given earlier. Thus, for example, if the user is at the function defined at prompt 210*b* but wishes to now accomplish a function at prompt 208*b*, he need only press (#,2,5) in order to return to that function.

Finally, the user may return backwards to the beginning prompt at a specified level of prompts at any time during the session. For example, if the user is at prompt level 3 but wishes to return to prompt level 1, the user may press (*,1) (or say "back, 1") to return to prompt level 1. In this case, the user will be presented with prompt 204*a*. Alternatively, the system may be configured such that the user may return backwards a predetermined number of levels according to user input. For example, the user may press (*) followed by 2 or say, "back, 2" in order to return from prompt level 3 up to prompt level 1.

Turning now to FIG. 4, a flow chart of operation of an embodiment of the present invention is shown. In a step 302, a user is allowed to access the telephone prompt menu system and is provided with a message at a first level. The user is then presented with a first of a sequence of prompts in a step 304. During presentation of a prompt message the user may select a function key or sequence of keys or speak a command in a step 306. If the user does so, the user will be presented with a prompt message corresponding to either a next prompt in the same level or a specified prompt at a lower level or the same level in a step 310. If, however, in step 306 the user did not press any function key, the user would merely be provided with the sequence of prompts in a step 308. It is noted that the system may provide a time-out or disconnect if no input is received within a predetermined period. If the user selected a key in step 308, the user would then be driven to a next level of prompts in a step 310. As discussed above, selection of a function key or keys in step 306 may include 1) referencing a preprogrammed alphanumeric address; 2) a predetermined higher level or levels above the present level; or 3) a next prompt at a same level of prompts. It may further allow the user to speak a folder, label, prompt name, or start of the application, or coordinate and be directed to the corresponding folder or application. Either a text or voice based search routine may be employed.

Turning now to FIG. 5, a flow chart 400 illustrating a method for recording and storing a navigation path or destination is shown. The method of FIG. 5 is particularly useful in a system having no voice recognition capabilities or only limited capabilities. In an initial step, for example, in a welcome message, the CPU 102 may access the voice generator 106 to provide a message to a user such that the user enters a record mode in a step 402. Entry into the record mode 402 may be accomplished, for example, by the user selecting a particular key or sequence of keys on his telephone keypad, or by speaking a particular phrase. If the user does enter the record mode, the user will be presented with a sequence of prompts in the standard order in a step 404. At any stage along the way, the user may select a prompt by speech or keyed entry in a step 406. The user's selection of a prompt may include skipping to a prompt at another level or another prompt within the same level or it may include proceeding through the prompts in the standard fashion. In either case, the CPU 102 records the selection and associates it with the user's identification number in a step 408. The user then is navigated to the appropriate level in a step 410, whereupon the user makes the desired selection in a step 412. The CPU 102 then performs the desired function and records the final selection in a step 414. If the user has not already done so, the user may store an identification code in a step 416 which the CPU will store in storage unit 104. The identification code may be an account number, for example, or other standard means of identification. The next time the user logs into the system, the user will be given the option of selecting the recorded destination path as described above.

Turning now to FIG. 6A, a flow chart illustrating a method for processing received voicemail messages according to an embodiment of the present invention is shown. More particularly, in a step 602, a caller may connect to the user's mailbox. The voicemail system will then permit the caller to deliver a message and will prompt the caller to provide a subject line in a step 604. The subject line will be received in a step 608. The subject line may include a voice subject line or a text subject line which may itself be converted to phoneme. The voice recognition unit 105 may recognize key phrases, for example, by phoneme extraction and comparison, as described above. According to one embodiment of the present invention, if the subject line is entered as a voice message, it may be converted to text in a step 610. Converting the received message to text includes, for example, analyzing the frequency spectrum and identifying phonemes corresponding to appropriate speech signals and parameters. Finally, once the subject line is input and identified, the messages are stored for delivery according to subject line.

An alternative method for organizing messages grouped by topic is illustrated as a flow chart in FIG. 6B. More particularly, a caller may connect to a mailbox in a step 614. The caller may then record a message in a step 616. If a voice subject line is to be added, in a step 618, the user may speak the subject line in a step 622. The corresponding voice data are then stored in a step 624. If, in step 618, however, a subject line was not available, then the caller would simply speak the entire message and the system would analyze the whole or a predetermined portion of the message in a step 620. Relevant terms such as may be prerecorded may then be classified and stored as phonemes in a step 624. When the user wishes to access his messages he may do so by speaking a topic and they will be delivered.

FIG. 6C illustrates a flow chart of a method for a user to access a mailbox. In a step 626, the user accesses his mailbox, for example, by keying in or speaking an identification code following entry of his mailbox number. In a step 628, the voicemail system may recite a list of subjects of messages. It is noted that the subjects or labels may be either caller-provided (in the case of unplayed messages) or may be user-defined (in the case of already-played, stored messages). In the case of unplayed messages, at the end of each recitation, the user is given the option of pressing a key or speaking a command to access the message in a step 630. In case of stored messages, access may be made directly to the message, as described above (e.g., by inputting the coordinate or by speaking the subject or label name). Once the user presses the key or answers "yes", the message will be delivered in a step 632. As will be discussed in greater detail below, in the case of accessing unplayed messages, the user may then be provided with the option of saving the message according to the caller's subject or may change the caller-provided subject to one of his own choice.

An alternate method for accessing messages in a mailbox is shown in FIG. 6D. As above, the user accesses his mailbox in a step 634. In a step 636, the user may speak a subject line or topic, for example. The subject line or topic may be that of either unplayed or stored messages. In a sorting step 638, the voicemail system's voice recognition unit 105 will analyze the spoken input and compare the phonemes with those of the stored subject lines. The system will then identify the corresponding subject line and provide the message in a step 640. Again, as will be discussed in greater detail below, in the case of unplayed messages, the user may then store the message on-the-fly according to a newly-created or already existing folder hierarchy.

A flowchart of such a method for organizing messages in a mailbox according to an embodiment of the present invention is shown in FIG. 7. More particularly, user access to a mailbox may be allowed in a step 702. The voicemail system may then play the unplayed corresponding messages in a step 704. As discussed above, the unplayed messages may be stored in an "in box" according to a caller-defined subject line. Once the messages are played, the user may be given the option of storing the messages in a step 706. If the user does not wish to store the messages, then the voicemail system will prompt the user to exit the mailbox system or to access another message. If the user wishes, however, to store the message, an opportunity is provided to identify the appropriate folder for which the message is to be stored in a step 708. User identification of the folder or label overrides the caller-supplied subject line or label, if any. The user may identify the folder by keying in letters on a touch-tone keypad or by speaking the name of the folder. If the system has voice recognition capabilities, the spoken word will be compared with the subjects of the stored folders. This comparison may be either through voice analysis (i.e., directly comparing the phonemes of the spoken words with those which identify the folders, or by text-converting the spoken words and comparing the text-converted subject line with text-converted folder names, or by comparing phoneme-converted text to stored phonemes). If the folder is identified as an existing folder in a step 710, then the message will be stored therein in a step 714.

If, however, in step 710 the message was identified as not pertaining to an existing folder, then a new folder would be created in a step 712 with the message being stored therein in a step 714. Creation of the new message folder may be by either voice methods or by keying in on a keypad, or on a keyboard affixed to a computer. Such keying in may be followed by phoneme conversion. Once the folders are identified, they may be stored on computer and converted to text such that a user may access them via a text-based graphical user interface.

Turning now to FIG. 8, a flowchart 800 illustrating a method for creating mailbox macros according to an embodiment of the present invention is illustrated. More particularly, the present invention provides a capability to create mailing lists, including "forwarding" lists or "distribution" lists, outcalling schedules, and messages on the fly. In a step 802, the user accessing the messaging system from a displayless interface inputs a command to create a mailing list. This may include, for example, speaking "Create list." Alternatively, the user may key in a predetermined sequence of keys, as discussed above. Once the user has accessed the "create list" function, he can create the actual list, in a step 804. This may include, for example, the user speaking a desired forwarding number and recipient name. Once the desired mailing list has been created, the user stores the list in a folder with a subject heading, in a step 806. This can include, for example, the user speaking the name of the mailing list; the system associates the subject name with the mailing list folder in a manner similar to that discussed above.

The list may then be used to forward messages and/or transmit messages according to a predefined schedule. For example, in a step 808, the user may access a message. This can include accessing a newly-received message, retrieving a stored message, or creating a new message. Once the message has been accessed or created, the user may forward or transmit the message to the group defined in the mailing list, in a step 810. For example, when prompted by the messaging system whether the user wishes to forward the message, the user can speak the name of the mailing list folder. The user may also speak a specific time at which he wishes the message to be transmitted. The system accesses the folder defining the mailing list and reads the recipient names and numbers and forwards the message accordingly.

The invention described in the above detailed description is not intended to be limited to the specific form set forth herein but, on the contrary, it is intended to cover such alternatives, modification and equivalents as can reasonably be included within the spirit and scope of the appended claims.

What is claimed is:

1. A method for accessing an interactive voice response system, comprising:

providing a predetermined sequence of prompts, each of said prompts having a coordinate associated therewith;

permitting a user to store a coordinate associated with a terminus, said permitting including learning a path based on a history of said user accessing said terminus; and permitting access to said terminus defined by said sequence of prompts upon said coordinate being input directly by a user;

wherein a user can access one hierarchical level of said prompt sequence from another hierarchical level in predetermined increments, by said user directly inputting said increments.

2. A method according to claim 1, wherein said permitting access includes identifying a voice command.

3. A method according to claim 1, wherein said permitting access includes responding to a keypad input.

4. A method according to claim 3, wherein said permitting access includes identifying dual tone multi-frequency signals representative of said coordinates.

5. A method according to claim 1, wherein said corresponding coordinate may be input while a different prompt is being delivered.

6. A method according to claim 1, wherein said coordinate is indicative of a hierarchical level of said prompt.

7. A method according to claim 6, wherein said permitting includes permitting access from a lower hierarchial level of prompts to a higher hierarchical level.

8. A method according to claim 6, wherein said permitting includes permitting access from a higher hierarchical level of prompts to a lower hierarchical level.

9. An interactive voice response system, comprising:

means for providing a predetermined sequence of prompts, each of said prompts having a coordinate associated therewith;

means for permitting a user to store a coordinate associated with a terminus, said permitting means including means for learning a path based on a history of said user accessing said terminus; and means coupled to said providing means for accessing said terminus defined by said sequence of prompts upon said coordinate being input directly by said user;

wherein a user can access one hierarchical level of said prompt sequence from another hierarchical level in predetermined increments, by said user directly inputting said increments.

10. A system according to claim 9, wherein said accessing means includes means for identifying a voice command.

11. A system according to claim 9, wherein said accessing means includes means for responding to a keypad input.

12. A system according to claim 11, wherein said accessing means includes means for identifying dual tone multi-frequency signals representative of said coordinates.

13. A system according to claim 9, wherein said corresponding coordinate may be input while a different prompt is being delivered.

14. A system according to claim 9, wherein said coordinate is indicative of a hierarchical level of said prompt.

15. A system according to claim 14, wherein said accessing means includes means for permitting access from a lower hierarchial level of prompts to a higher hierarchical level.

16. A system according to claim 14, wherein said accessing means includes means for permitting access from a higher hierarchial level of prompts to a lower hierarchical level.

17. An interactive voice response system, comprising:

means for providing a predetermined sequence of prompts, each of said prompts having a coordinate associated therewith;

means for permitting a user to store a coordinate associated with a terminus, said permitting means including means for learning a path based on a history of said user accessing said terminus;

means coupled to said providing means for accessing said terminus defined by said sequence of prompts upon said coordinate being input directly by said user; and means for accessing a hierarchical level of said prompt sequence from another hierarchical level in predetermined increments by said user directly inputting said increments.

18. An interactive voice response system in accordance with claim 17, said coordinate comprising a sequence of one or more numbers corresponding to keypunches required at individual hierarchical levels.

* * * * *